United States Patent
Wang et al.

(10) Patent No.: US 10,282,169 B2
(45) Date of Patent: May 7, 2019

(54) FLOATING-POINT MULTIPLY-ADD WITH DOWN-CONVERSION

(71) Applicant: Apple Inc., Cupertino, CA (US)

(72) Inventors: Liang-Kai Wang, Austin, TX (US); Terence M. Potter, Austin, TX (US); Andrew M. Havlir, Orlando, FL (US); Yu Sun, Austin, TX (US); Nicolas X. Pena, Austin, TX (US); Xiao-Long Wu, Austin, TX (US); Christopher A. Burns, Austin, TX (US)

(73) Assignee: Apple Inc., Cupertino, CA (US)

(*) Notice: Subject to any disclaimer, the term of this patent is extended or adjusted under 35 U.S.C. 154(b) by 194 days.

(21) Appl. No.: 15/092,401

(22) Filed: Apr. 6, 2016

(65) Prior Publication Data

US 2017/0293470 A1    Oct. 12, 2017

(51) Int. Cl.
*G06F 7/483*    (2006.01)
*G06F 7/544*    (2006.01)

(52) U.S. Cl.
CPC ............ *G06F 7/483* (2013.01); *G06F 7/5443* (2013.01)

(58) Field of Classification Search
CPC ........ G06F 7/483; G06F 7/487; G06F 7/4546; G06F 7/49947; G06F 9/30014
USPC ................. 708/495, 501, 503, 508
See application file for complete search history.

(56) References Cited

U.S. PATENT DOCUMENTS

| | | | |
|---|---|---|---|
| 8,078,660 B2 | 12/2011 | Quinnell et al. | |
| 8,106,914 B2 | 1/2012 | Oberman et al. | |
| 8,990,282 B2 | 3/2015 | Lutz | |
| 2006/0101244 A1* | 5/2006 | Siu | G06F 7/483 712/221 |
| 2011/0040822 A1* | 2/2011 | Eichenberger | G06F 9/30014 708/607 |
| 2016/0004505 A1 | 1/2016 | Elmer | |

* cited by examiner

*Primary Examiner* — Michael D. Yaary
(74) *Attorney, Agent, or Firm* — Meyertons, Hood, Kivlin, Kowert & Goetzel, P.C.

(57) ABSTRACT

Techniques are disclosed relating to floating-point operations with down-conversion. In some embodiments, a floating-point unit is configured to perform fused multiply-addition operations based on first and second different instruction types. In some embodiments, the first instruction type specifies result in the first floating-point format and the second instruction type specifies fused multiply addition of input operands in the first floating-point format to generate a result in a second, lower-precision floating-point format. For example, the first format may be a 32-bit format and the second format may be a 16-bit format. In some embodiments, the floating-point unit includes rounding circuitry, exponent circuitry, and/or increment circuitry configured to generate signals for the second instruction type in the same pipeline stage as for the first instruction type. In some embodiments, disclosed techniques may reduce the number of pipeline stages included in the floating-point circuitry.

20 Claims, 8 Drawing Sheets

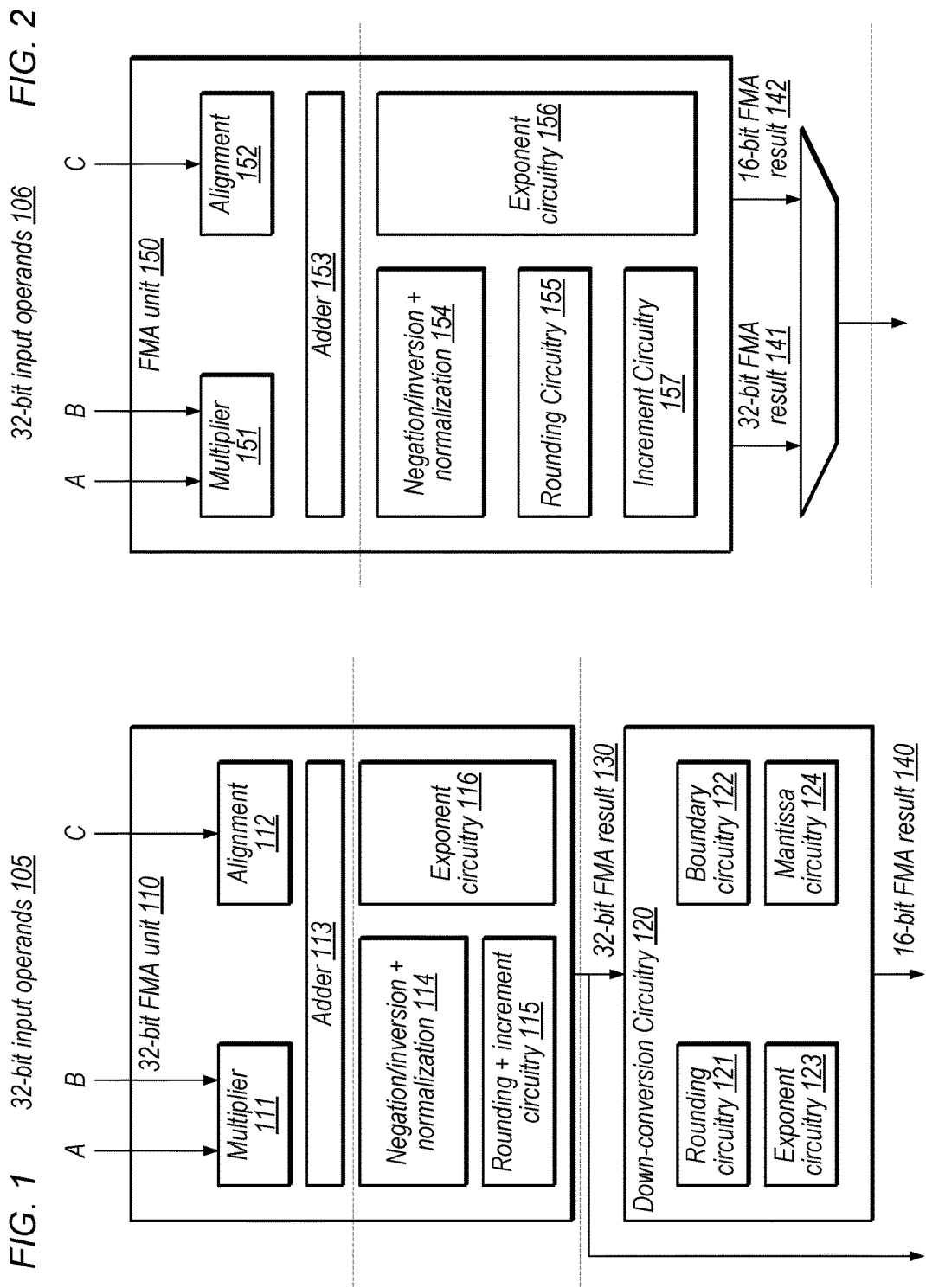

|  | 32-bit Adjustment Value (added to sum of expA and expB) | 16-bit Adjustment Value (added to sum of expA and expB) |
|---|---|---|
| Near Path | +10'b11_1000_0010 | +10'b11_0001_0010 |
| Far Path | +2 (10'b00_0000_0010)<br>+1 (10'b00_0000_0001)<br>+0 (10'b00_0000_0000)<br>-1 (10'b11_1111_1111) | -110 (10'b11_1001_0001)<br>-111 (10'b11_1001_0000)<br>-112 (10'b11_1000_1111)<br>-113 (10'b11_1000_1110) |

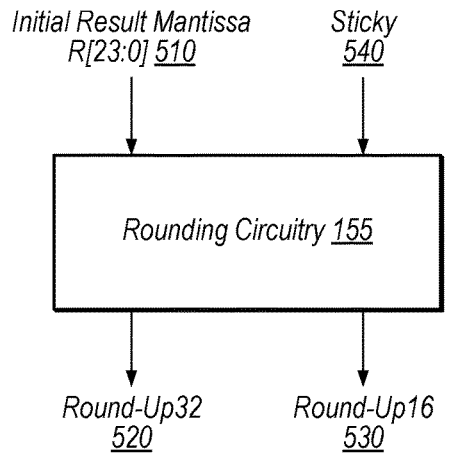

FIG. 5A

Parameters for 16-bit 540:

LSB16 = R[13]
Guard16 = R[12]
Round16 = R[11]
Sticky16 = OR of all bits in R[10:0]
AllOne16 = AND of all bits in R[10:0]

Signals for Negation Embodiments 560:

Round-Up32 = Round32 & (LSB32 | Sticky32)

Round-Up16 = Guard16 & (LSB16 | Round16 | Sticky16 | Round32 & Sticky32) | LSB16 & Round16 & AllOne16 & Round32

Signals for Inversion Embodiments 570:

Round-Up32 = Round32 & (LSB32 | Sticky32) | Negative_result & ~Round32 & AllOne32

Round-Up16 = Guard16 & (LSB16 | Round16 | Sticky16 | Round32 & Sticky32 | Negative_result & ~Round32 & AllOne32) | LSB16 & Round16 & AllOne16 & Round32

FIG. 5B

FLOATING-POINT MULTIPLY-ADD WITH DOWN-CONVERSION

BACKGROUND

Technical Field

This disclosure relates generally to computing systems and more particularly to floating-point circuitry.

Description of the Related Art

Some computer processing elements are configured to perform operations using different floating-point precisions, e.g., in different operating modes. For example, a graphics processor may operate in a low-power mode in which it performs 16-bit arithmetic or a high-performance mode in which it performs 32-bit arithmetic. In some embodiments, a processor may be configured to execute instructions of an instruction set architecture (ISA) that includes fused multiply-add (FMA) operations for floating-point numbers. These operations perform a multiplication of first and second input operands, add a third operand to the result, and then perform rounding and exception checking on the result of the add. (The use of the term "fused" means that the add is performed without first rounding a result of the multiplication). Some ISAs may include FMA instructions with input operands in a first floating-point precision (e.g., 32-bit) and a result in a second, lower floating-point precision (e.g., 16-bit). The ISA may specify that the result of such an FMA with down-conversion is to be numerically equivalent to generating a result in the first precision (with any rounding needed for the first precision) and then down-converting (with any rounding needed for the down-conversion). Performing the FMA and down-conversion separately, however, may increase the number of cycles needed and/or the clock cycle length for FMA operations.

SUMMARY

Techniques are disclosed relating to performing floating-point operations that include down-conversion. In some embodiments, a floating-point unit is configured to perform fused multiply-addition operations for first and second different instruction types. In some embodiments, the first instruction type specifies fused multiply-addition of input operands in a first floating-point format that also generate a result in the first floating-point format. For example, the first floating-point format may be a 32-bit floating-point format. In some embodiments, the second instruction type specifies fused multiply addition of input operands in the first floating-point format to generate a result in a second, lower-precision floating-point format. For example, the second floating-point format may be a 16-bit floating-point format. In some embodiments, the second instruction type is performed such that results in the second floating-point format correspond to generating result of the fused multiply addition in the first floating-point format and then down-converting the result to the second floating-point format.

In some embodiments, the floating-point unit includes rounding circuitry, exponent circuitry, and/or increment circuitry configured to generate signals for the second instruction type in the same pipeline stage as for the first instruction type. These signals may include a rounding action signal, an exponent adjustment value, and/or an incremented mantissa and/or exponent. In some embodiments, the floating-point unit generates one or more of these signals prior to generating a fused multiply-addition result in the first floating-point format. In some embodiments, these techniques may reduce the number of pipeline stages included in the floating-point circuitry, relative to first generating a fused multiply-addition result in the first floating-point format and then down-converting.

BRIEF DESCRIPTION OF THE DRAWINGS

FIG. 1 is a block diagram illustrating an exemplary floating-point pipeline that includes a 32-bit fused multiply add (FMA) unit and down-conversion circuitry, according to some embodiments.

FIG. 2 is a block diagram illustrating an exemplary floating-point pipeline configured to generate adjustment signals in multiple formats in the same pipeline stages, prior to generating a 32-bit FMA result, according to some embodiments.

FIGS. 5A-5B are diagrams illustrating exemplary rounding circuitry, according to some embodiments.

Figure 3:
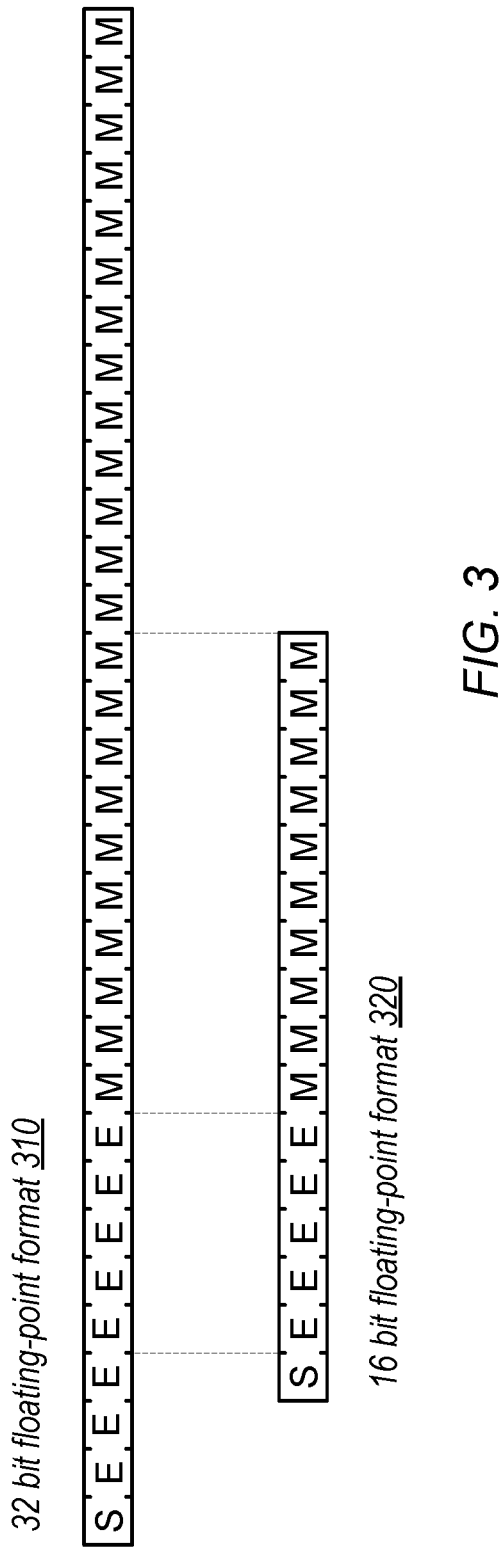
FIG. 3 illustrates exemplary 16-bit and 32-bit floating-point formats, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to"

perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

Figure 8:
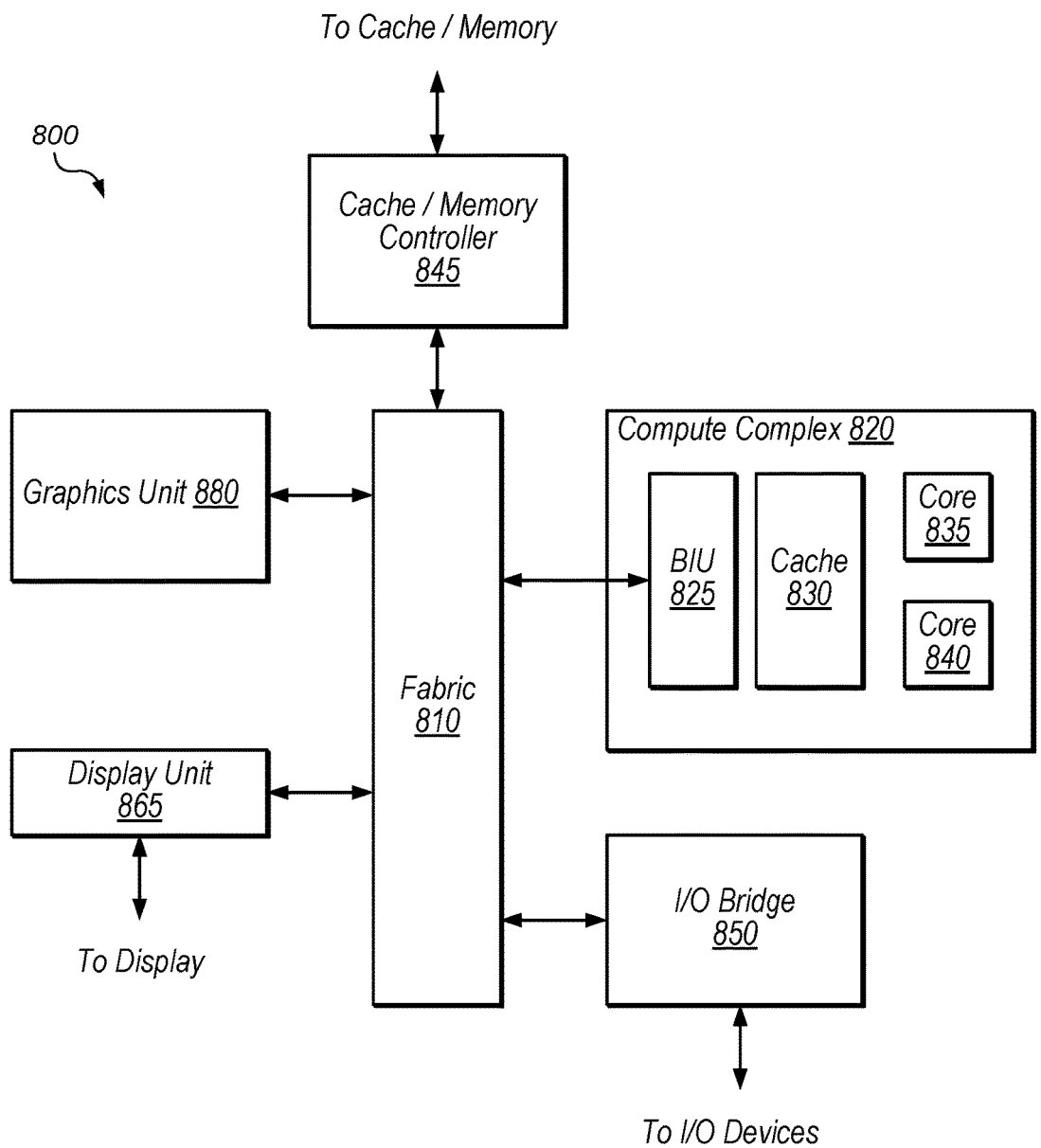
FIG. 8 is a block diagram illustrating an exemplary device, according to some embodiments.
Figure 9A:
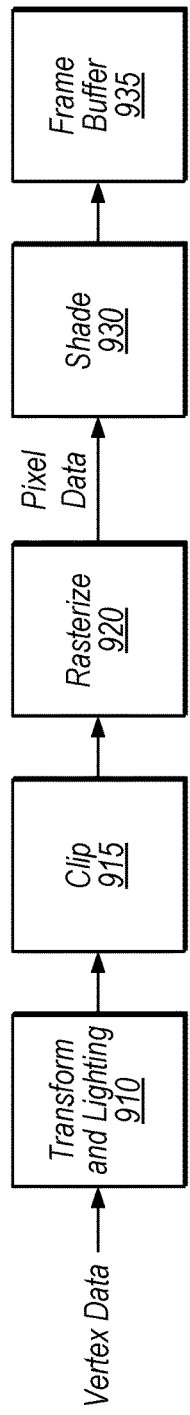
FIG. 9A is a block diagram illustrating an exemplary graphics processing flow.
Figure 9B:
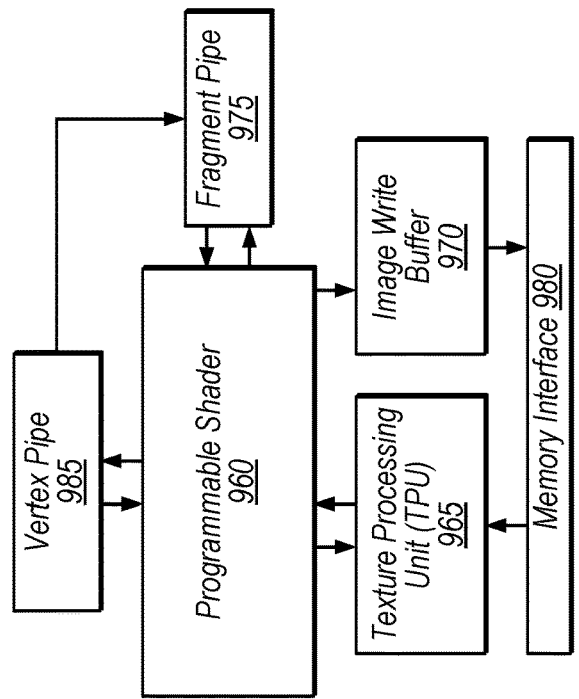
FIG. 9B is a block diagram illustrating one embodiment of a graphics unit.

This disclosure initially describes, with reference to FIGS. 1 and 2, exemplary floating-point unit pipelines. Exemplary floating-point formats with different precisions are shown in FIG. 3. Embodiments of techniques for efficiently generating results for floating-point multiply-add operations with down-conversion are discussed with reference to FIGS. 4-7. FIG. 8 shows a device while FIGS. 9A-9B illustrate exemplary graphics circuitry. In various embodiments, the disclosed techniques may reduce the number of stages needed in a floating-point pipeline.

Exemplary Floating-Point Units with Down-Conversion

FIG. 1 is a block diagram illustrating an exemplary floating-point unit configured to generate fused multiply-add (FMA) results based on 32-bit input operands 105 (operands A, B, and C). The result is either a 32-bit FMA result 130 or a 16-bit FMA result 140 (MUX circuitry, not shown, may be configured to select between these two outputs). In the illustrated embodiment, 16-bit FMA result 140 is generated by down-conversion circuitry 120 after the 32-bit FMA result 130 has been generated.

In some embodiments, the illustrated pipeline is configured to perform at least two types of FMA operations that have different output formats. In the illustrated embodiment, the output formats are a 32-bit floating-point format and a 16-bit floating format. Thus, in some embodiments, a computing device is configured to execute a first instruction type that specifies fused multiply-addition of input operands in a first floating-point format (e.g., 32-bit) to generate a result in the first floating-point format. In these embodiments, the computing device is further configured to execute a second instruction type that specifies fused multiply-addition of input operands in the first floating-point format to generate a result in a second, lower-precision floating-point format (e.g., 16-bit). In some embodiments, for the lower-precision output, the second instruction type specifies that the result in the second, lower-precision format corresponds to a result of the fused multiply addition in the first floating-point format down-converted to the second floating-point format. For example, for a 16-bit output, the result of the second instruction type may correspond to generating a 32-bit result (with any appropriate rounding, e.g., round-to-nearest even (RTNE) in some embodiments) and then down-converting to a 16-bit output (which may include further rounding). FIGS. 1 and 2 show circuitry configured to execute both such first and second types of instructions. The circuitry in FIG. 2, however, is configured to do so using a smaller number of pipeline stages relative to the circuitry of FIG. 1, which may improve processing efficiency.

In various disclosed embodiments, 32-bit and 16-bit floating-point representations are used as examples of higher and lower precision floating-point representations for illustrative purposes. In other embodiments, any of various precisions (e.g., 8-bit, 64-bit, 128-bit, etc.) and formats (e.g., IEEE formats, proprietary formats, etc.) may be implemented, and greater number of different formats and/or precisions (e.g., three or more) may be implemented. The illustrated precisions and formats are not intended to limit the scope of the present disclosure.

32-bit FMA unit 110, in the illustrated embodiment, includes multiplier 111, alignment circuitry 112, adder 113, negation/inversion and normalization circuitry 114, rounding and increment circuitry 115, and exponent circuitry 116.

Multiplier 111, in some embodiments, is configured to multiply the mantissas of the A and B operands. Alignment unit 112, in some embodiments, is configured to align the C operand mantissa by shifting it to normalize it based on the exponent fields of operands A and B.

Adder 113, in some embodiments, is configured to add the output of multiplier 111 to the output of alignment circuitry 112.

Negation/inversion and normalization circuitry 114, in some embodiments, is configured to negate (e.g., using 2's complement) or invert (e.g., using 1's complement) the output of adder 113 if the result from adder 113 is negative. In embodiments in which circuitry 114 is configured to perform inversion, an increment by one may be used to complete the negation later in the pipeline. Circuitry 114, in some embodiments, is also configured to normalize the result (e.g., by shifting).

Rounding and increment circuitry 115, in some embodiments is configured to round the normalized result based on information from the normalization unit 114, information from the exponent circuitry 116, and a specified rounding mode. If rounding is determined to be needed, circuitry 115 may increment the result, which may also include incrementing the exponent, in some situations.

Exponent circuitry 116, in some embodiments, is configured to add the exponents of the A and B operands and adjust the result based on a difference between the result and the exponent of the C operand (which may also be referred to as an input addend).

Down-conversion circuitry 120, in the illustrated embodiment, includes rounding circuitry 121, boundary circuitry 122, exponent circuitry 123, and mantissa circuitry 124.

Rounding circuitry 121, in some embodiments, is configured to determine whether to round the 16-bit portion of the 32-bit result, e.g., by incrementing the mantissa and/or exponent of the 16-bit result if necessary. Exponent circuitry 123 and mantissa circuitry 124, in the illustrated embodiment, are configured to adjust the exponent and/or mantissa respectively based on rounding signals from rounding circuitry 121, in some embodiments.

Boundary circuitry 122, in some embodiments, is configured to detect conditions in which the 32-bit result cannot be represented using a 16-bit floating-point representation. For example, if the 32-bit result is too large or small to represent using the 16-bit representation, boundary circuitry 122 is configured to set the 16-bit result to plus or negative infinity.

In some embodiments, 32-bit FMA unit 110 is configured to generate 32-bit FMA result 130 in two clock cycles and 16-bit FMA result 140 using a third clock cycle. Thus, unit 110 and 120 may be described as having a floating-point pipeline with three stages. In the illustrated embodiment, the horizontal dashed lines delineate these pipeline stages. In some embodiments sequential circuit elements (e.g., flip-flops, not shown) are configured to store the output of adder 113 at the end of the first stage, the 32-bit FMA result 130 at the end of a second stage, and the 16-bit FMA result 140 at the end of a third stage. Thus, in the illustrated implementation, the conversion to the 16-bit representation requires an extra pipeline stage, which may be undesirable in some embodiments.

The concept of "pipelined" circuitry is well understood, and refers to the concept of splitting the "work" that circuitry performs on instructions into multiple stages. Many different pipeline architectures are possible with varying orderings of elements/portions. Various pipeline stages perform processing steps and then pass intermediate results on to other stages for further processing until a final result is achieved. A pipeline "stage" is configured to receive input data in a given clock cycle and produce a result (e.g., to pass to a subsequent stage) prior to the end of the clock cycle.

FIG. 2 illustrates a FMA unit 150 configured to generate adjustment signals for the 16-bit output format in parallel with signals for the 32-bit output format, which reduces the number of clock cycles needed for the floating-point pipeline, in some cases. In the illustrated embodiment, FMA unit 150 includes multiplier 151, alignment circuitry 152, adder circuitry 153, negation/inversion and normalization circuitry 154, increment circuitry 156, rounding circuitry 155, and exponent circuitry 156.

In some embodiments, corresponding elements in FIGS. 1 and 2 are configured to perform similar functionality. Specifically, the following elements correspond to one another in these figures: elements 111 and 151, 112 and 152, 113 and 153, 114 and 154, 115 and 155/157, and 116 and 156 are configured to perform similar functionality. For example, adder 153 may be configured to add the output of multiplier 151 and alignment circuitry 152 as described above with reference to adder 113 in FIG. 1.

In the illustrated embodiment, rounding circuitry 155, exponent circuitry 156, and increment circuitry 157 are further configured to generate signals for a 16-bit output format such that FMA unit 150 is configured to generate 16-bit FMA result 142 in the same pipeline stage as 32-bit FMA result 141. These elements are discussed in further detail below with reference to FIGS. 4-6.

In the illustrated embodiment, a MUX is configured to select between the 32-bit result 141 and 16-bit result 142. In the illustrated configuration, FMA unit 150 implements a two-stage pipeline, as illustrated by the horizontal dashed lines) The first stage ends with adder 153 and the second stage begins with elements 154 and 156. In other embodiments, any of various appropriate numbers of pipeline stages may be implemented. In various embodiments, signals for a lower-precision output format are generated in the same pipeline stages as for a higher-precision output format, which may eliminate a need for one or more separate pipeline stages to perform down-conversion.

Exemplary Floating-Point Formats

FIG. 3 illustrates an exemplary 32-bit floating-point format 310 and an exemplary 16-bit floating-point format 320. In the illustrated embodiment, format 310 includes a sign (S) bit, eight exponent (E) bits, and twenty-three mantissa (M) bits. In the illustrated embodiment, format 320 includes a sign bit, five exponent bits, and ten mantissa bits. The dashed lines show which bits of format 310 may initially correspond to bits of format 320. Converting a number in the 32-bit floating-point format 310 to the 16-bit floating-point format 320 may involve more than simply accessing the corresponding bits, e.g., because rounding may be needed and because some floating-point numbers in format 310 are not representable using format 320.

Exemplary Exponent Circuitry

Figures 4A, 4B:
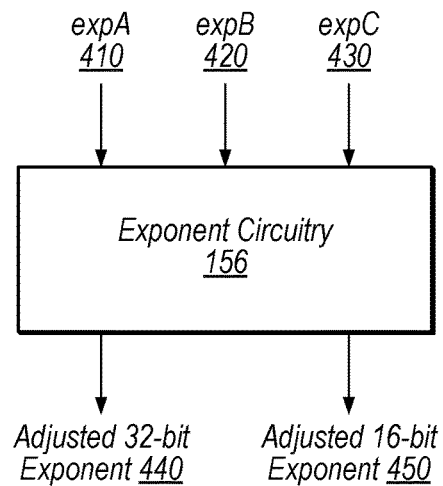
FIGS. 4A-4B are diagrams illustrating exemplary exponent adjustment circuitry, according to some embodiments.

FIG. 4A illustrates exponent circuitry 156 and FIG. 4B illustrates exemplary operations performed by exponent circuitry 156, according to some embodiments. In the illustrated embodiment, exponent circuitry is configured to receive exponents expA 410, expB 420, and expC 430 of the input operands and produce one or both of an adjusted 32-bit exponent 440 and adjusted 16-bit exponent 450.

In some embodiments, depending on the desired output format, exponent circuitry 156 is configured to generate only one of output signals 440 and 450 in a given cycle. In other embodiments, exponent circuitry 156 is configured to generate these signals in parallel. In some embodiments, exponent circuitry 156 is configured to generate signals 440 and 450 in the same pipeline stage. In some embodiments, this is the second pipeline stage of FMA unit 150. In some embodiments, exponent circuitry 156 is configured to generate the adjusted 16-bit exponent 450 prior to generating a 32-bit FMA result (e.g., in contrast to the embodiment of FIG. 1A in which down conversion circuitry 120 may adjust the exponent subsequent to production of 32-bit FMA result 130).

Exponent circuitry 156, in the illustrated embodiment, is configured to add the exponents of operands A and B and compare the result with the exponent of operand C. In the illustrated embodiment, exponent circuitry 156 is configured to operate differently for "far path" situations and "near path" situations. In far path situations, the difference between the sum of the A and B exponents and the C exponent is large, massive cancellation is not feasible, and the adjustment is between −1 and 2 inclusive (depending on the location of the first non-zero bit in the mantissa of the output of adder 153). In near path situations the difference is small, massive cancellation may be used, and the exponent value of the anchor point is adjusted by the number of mantissa bits needed to normalize the anchor point. Near and far path floating-point circuitry is well-understood to those of skill in the art and therefore is not explained in further detail here. In the illustrated embodiment, exponent circuitry 156 is configured to generate different adjustment values for near and far path for 16-bit and 32-bit output formats.

For the near path situation, in the illustrated embodiment, exponent circuitry 156 is configured to add the value 1110000010 (binary)=−126 (decimal) to the sum of expA and expB to generate 32-bit exponent 440. Similarly, exponent circuitry 156 is configured to add the value 110010010 (binary)=−110 (decimal) to the sum of expA and expB to generate 16-bit exponent 450. These adjustments may be performed in parallel, in some embodiments, or may be performed separately, e.g., to produce the correct result depending on the output format of the current instruction. In some embodiments, a MUX (not shown) is configured to select between the adjusted 32-bit exponent 440 and the adjusted 16-bit exponent 450.

In some embodiments, exponent circuitry 156 include circuitry configured to directly generate the constant value using the output format signal. For example, for far path in FIG. 4B, the following code indicates how the adjusted exponent value is generated based on the output format and the most significant bit of the result from the adder, according to some embodiments:

adjusted_value[9:0]={e3_f16_out, e3_f16 out, e3_f16 out, 2'b0, e3_f16 out, 2'b0, 1'b1, 1'b0}; //+2 in F32 or −110 in F16 adjusted_value[9:0]={e3_f16 out, e3_f16 out, e3_f16 out, 2'b0, e3_f16 out, 3'b0, 1'b1}; //+1 in F32 or −111 in F16 adjusted_value[9:0]={e3_f16 out, e3_f16 out, e3_f16 out, 2'b0, e3_f16 out, 4'b0}; //+0 in F32 or −112 in F16 adjusted_value[9:0]={3'b111, ~e3_f16 out, ~e3_f16 out, ~e3_f16 out, 4'b1111}; //−1 in F32 or −113 in F16

In the illustrated embodiments, the adjustments are incremented by 1 (e.g., rather than using the values −127 and −111) because subsequent processing of the exponent may involve subtracting by the leading zero count which may involve adding the inverse of the leading zero count plus 1. Thus, the illustrated adjustments simply incorporate the "plus 1" into the exponent adjustment. In other embodiments, these adjustments may or may not incorporate such incremented values.

For the far path situation, in the illustrated embodiment, exponent circuitry 156 is configured to add either −1, 0, 1, or 2 to the sum of expA and expB to generate 32-bit exponent 440. In the illustrated embodiment, exponent circuitry 156 is configured to add either −113, −112, −111, or −110 to the sum of expA and expB to generate 16-bit exponent 450. In some embodiments, the selection among these adjustment values is based on the location of the first non-zero bit in the mantissa of the output of adder 153. Determining the 16-bit adjustment value in exponent circuitry 156 prior to generating a 32-bit FMA result may reduce the number of cycles needed for FMA operations that include a down-conversion, in various embodiments.

Exemplary Rounding Circuitry

FIG. 5A illustrates rounding circuitry 155 and FIG. 5B explains exemplary operations performed by rounding circuitry 155, according to some embodiments. In the illustrated embodiment, rounding circuitry 155 is configured to receive a sticky signal 540 and the mantissa of an initial result of the multiplication-addition R[23:0] 510 (e.g., from circuitry 154 in some embodiments) and generate round-up32 signal 520 and/or round-up16 signal 530. Signals 520 and 530 may be referred to as rounding action signals, and indicate whether rounding should occur in the illustrated embodiment. In particular, the round-up32 signal may be used to determine whether to increment the intermediate result when a 32-bit output is specified and the round-up16 signal may be used to determine whether to increment the intermediate result when a 16-bit output is specified.

In some embodiments, rounding circuitry 155 is configured to generate signals 520 and 530 in parallel. In other embodiments, rounding circuitry 155 is configured to generate one or the other of the signals in a given clock cycle (e.g., circuitry for generating the other signal may be clock gated to reduce power consumption). In various embodiments, rounding circuitry 155 is configured to generate round-up16 signal 530 prior to generating a 32-bit FMA result. Note that, as used herein, performing an action "prior to" generating a particular result includes performing the action even if the particular result is never generated. For example, in the embodiment of FIG. 2, adjustment signals for the 16-bit FMA result 142 are generated prior to generating 32-bit FMA result 141 for a particular instruction even if the result 141 is never generated for the particular instruction (e.g., if 32-bit output circuitry is clock gated or powered down in response to specification of a 16-bit result). In contrast, in the embodiment of FIG. 1, 16-bit FMA result 140 is not generated prior to generating a 32-bit FMA result 130, at least because 16-bit FMA result 140 is generated based on the 32-bit FMA result 130 in the embodiment of FIG. 1.

Parameters 540, in the illustrated embodiment, include a least-significant bit for 16-bit rounding LSB16 which corresponds to R[13], a guard bit for 16-bit rounding guard16 which corresponds to R[12], a round bit round16 for 16-bit rounding which corresponds to R[11], A sticky bit for 16-bit rounding sticky16 which corresponds to the OR of all bits in R[10:0] and a bit that indicates whether bits R[10:0] are all ones allOne16. These signals are used, in the illustrated embodiment, to determine the value of round-up16 signal 530.

The round-up signals may be determined differently depending on whether negation or inversion is initially used in circuitry 154. Inversion involves switching the polarity of bits of a value, while negation involves switching the polarity of the bits and further adding a 1 to the least significant bit of the result. Rounding circuitry 155 is configured to generate signals 560 in some negation embodiments. Rounding circuitry 155 is configured to generate signals 570 in some inversion embodiments.

For the illustrated negation embodiment, rounding circuitry 155 is configured to generate round-up32 signal 520 according to equation (1) below:

Round-Up32=Round32 &(LSB32Sticky32)     (1)

where & represent a logical AND operation and represents a logical OR operation, round32 indicates whether 32-bit rounding is desired and LSB32 and sticky32 correspond to the well-understood least-significant-bit and sticky bit respectively for 32-bit rounding.

For the illustrated negation embodiment, rounding circuitry 155 is configured to generate round-up16 signal 530 according to equation (2) below:

Round-Up16=Guard16 &
(LSB16|Round16|Sticky16|Round32 &
Sticky32)|LSB16 & Round16 & AllOne16 &
Round32     (3)

For the illustrated inversion embodiment, rounding circuitry 155 is configured to generate round-up32 signal 520 according to equation (3) below:

Round-Up32=Round32 & (LSB32|Sticky32)|negative_result & ~Round32 & AllOne32     (3)

where the negative_result signal indicates a negative result and the AllOne32 signal indicates whether lower bits of the result are all logical ones.

For the illustrated inversion embodiment, rounding circuitry 155 is configured to generate round-up16 signal 530 according to equation (4) below:

Round-Up16=Guard16 &
(LSB16|Round16|Sticky16|Round32 &
Sticky32|Negative_result & ~Round32 &
AllOne32)|LSB16 & Round16 & AllOne16 &
Round32     (4)

Thus, rounding circuitry 155 is configured to generate the round-up16 signal 530 prior to generating a 32-bit FMA result but is configured to generate signal 530 as if a 32-bit FMA result had been generated (including rounding using round-to-nearest-even, for example) and then down-converted to a 16-bit floating-point representation and rounded based on signal 530. Generating signal 530 early in the pipeline (e.g., using the same pipeline stage used to generate signal 520) may reduce the number of pipeline stages needed in the FMA pipeline, in various embodiments, while still providing a correct result for FMA instructions that specify a 16-bit output format.

Exemplary Increment Circuitry

Figure 6A:
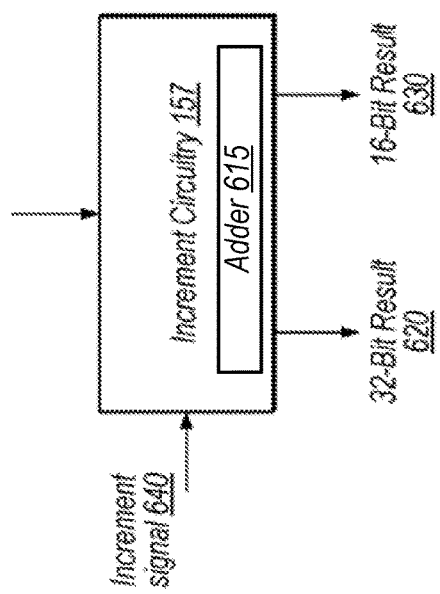
FIGS. 6A-6B are diagrams illustrating exemplary increment circuitry, according to some embodiments.
Figure 6B:
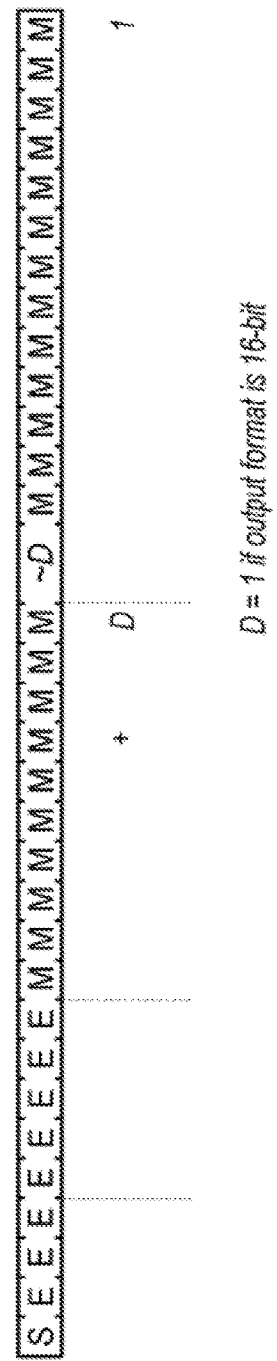

FIG. 6A illustrates increment circuitry 157 and FIG. 6B explains exemplary operations performed by increment circuitry 157, according to some embodiments. In the illustrated embodiment, increment circuitry 157 is configure to receive an increment signal 640 (which may be generated by rounding circuitry 155, for example) and provide 32-bit incremented result 620 and 16-bit incremented result 630. In other embodiments, increment circuitry 157 is configured to generate incremented results prior to increment circuitry 157 generating rounding signal. In these embodiments, increment circuitry 157 may be configured to select either an original result or an incremented result, e.g., based on whether rounding should occur. The input to increment circuitry 157 may include mantissa and exponent portions from circuitry 154.

FIG. 6B shows exponent and mantissa bits that are input to increment circuitry 157 in one embodiment. In the illustrated embodiment, increment circuitry is configured to add a 1 to this input to generate 32-bit result 620. This increment is not needed for 16-bit incrementation, however, and could carry over and affect 16-bit incremented result 630. Therefore, in the illustrated embodiment, a dummy bit D is used and an additional bit is included in the adder 615 show in FIG. 6A. In the illustrated embodiment, D is 1 when the specified output mode is 16-bit, such that ~D will be zero and prevent any carry from the added one at the least significant mantissa bit from affecting the 16-bit result 630. If the specified output mode is 32-bit, then ~D will be one, allowing a carry to occur if needed. Note that the dummy bit, in some embodiments, is internal to increment circuitry 157 and is not included in outputs 620 or 630. In some embodiments, if carry occurs all the way to the most significant bit of the mantissa for either 16-bit or 32-bit outputs, it may carry over such that the exponent is incremented.

In other embodiments, separate adder circuitry may be used to generate 32-bit result 620 and 16-bit result 630. Power consumption may be reduced, in these embodiments, by powering-down the unused adder in a given clock cycle. This may, however, consume significantly more processor area, relative to the illustrated embodiment in which the same adder circuitry is used for both 16-bit and 32-bit output formats.

In some embodiments, increment circuitry 157 is configured to generate signals 620 and 630 in parallel. In other embodiments, increment circuitry 157 is configured to generate one or the other of the signals in a given clock cycle. In some embodiments, the 16-bit result signal 630 is included as part of the 32-bit result signal 620 (e.g., a portion of the bits of the 32-bit exponent may be used as the incremented 16-it exponent and a portion of the bits of the 32-bit mantissa may be used as the 16-bit incremented mantissa, as illustrated by the dashed lines in FIG. 6B) In various embodiments, increment circuitry 157 is configured to generate 16-bit result signal 630 prior to generating a 32-bit FMA result.

As used herein, the term "adjustment circuitry" refers to circuitry 155, 156, and 157 and the term "adjustment signal" refers to a signal generated by adjustment circuitry. Therefore, in various embodiments, FMA unit 150 is configured to generate adjustment signals for different output formats using the same pipeline stage and is configured to generate adjustment signals for a lower-precision output format prior to generating an FMA result in a higher-precision output format.

Exemplary Methods

Figure 7A:
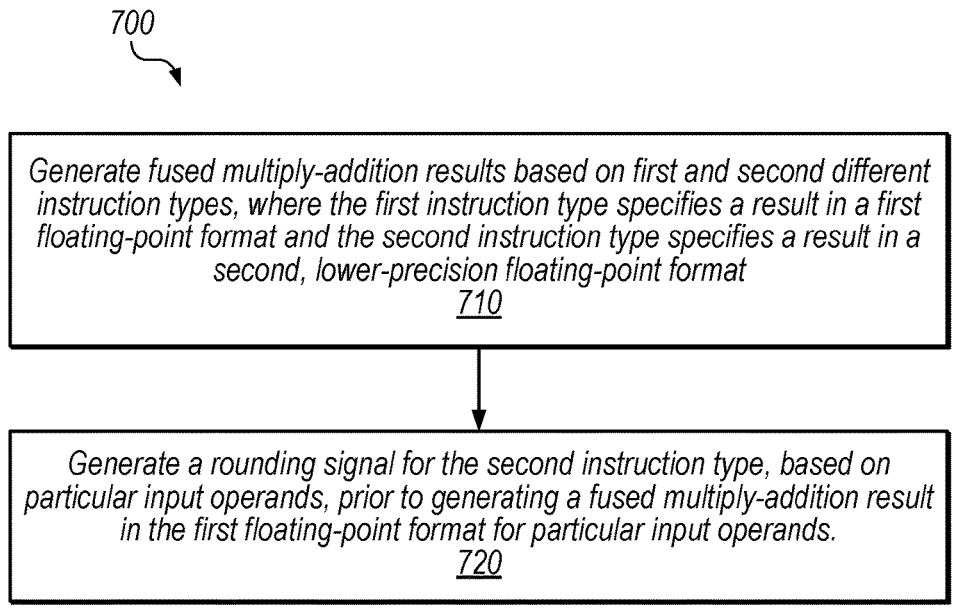
FIGS. 7A-7B are a flow diagram illustrating methods for generating a fused multiply-addition result, according to some embodiments.

FIG. 7A is a flow diagram illustrating a method 700 for performing floating-point operations, according to some embodiments. The method shown in FIG. 7A may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. Flow begins at 710.

At 710, in the illustrated embodiment, FMA unit 150 generates fused multiply-addition results based on first and second different instruction types, where the first instruction type specifies a result in a first floating-point format (e.g., 32-bit) and the second instruction type specifies a result in a second, lower-precision floating-point format (e.g., 16-bit). In some embodiments, the second instruction type specifies to generate results in the second floating-point format that correspond to generating result of the fused multiply addition in the first floating-point format and down-converting the result to the second floating-point format. For example, the second instruction type may specify to generate a result that is equivalent to performing fused multiply-addition of 32-bit inputs to generate a 32-bit result (including rounding operations if needed) and then down-converting to a 16-bit final result.

At 720, in the illustrated embodiment, FMA unit 150 generates a rounding signal for the second instruction type, based on particular input operands, prior to generating a fused multiply-addition result in the first floating-point format for the particular input operands. (This may include, for example, generating a 16-bit result without generating a 32-bit FMA result at all or generating a 16-bit result before generating a 32-bit FMA result for the particular input operands).

In some embodiments, FMA unit 150 is also configured to generate an exponent adjustment value and/or an increment value for the second instruction type (e.g., as discussed above with reference to FIGS. 4 and 6) prior to generating a fused multiply-addition result in the first floating-point format for the particular input operands.

Figure 7B:
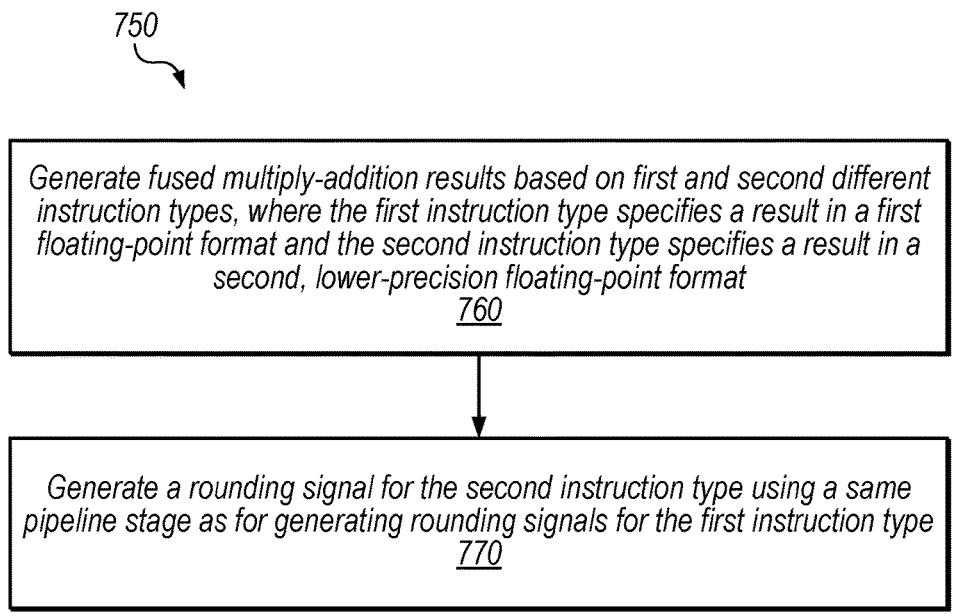

FIG. 7B is a flow diagram illustrating a method 750 for performing floating-point operations, according to some embodiments. The method shown in FIG. 7B may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. Flow begins at 760.

At 760, in the illustrated embodiment, FMA unit 150 generates fused multiply-addition results based on first and second different instruction types, where the first instruction type specifies a result in a first floating-point format (e.g., 32-bit) and the second instruction type specifies a result in a second, lower-precision floating-point format (e.g., 16-bit). In some embodiments, this step is similar to step 710 of FIG. 7A.

At 770, in the illustrated embodiment, FMA unit 150 generates a rounding signal for the second instruction type using a same pipeline stage as for generating rounding signals for the first instruction type. For example, the rounding circuitry 155 shown in FIG. 5A may be configured to generate round-up32 signal 520 and round-up16 signal 530 in the same pipeline stage (which may include generating both signals in the same clock cycle, or generating only one or the other of the signals using the pipeline stage, e.g., depending on the specified output format). In some embodiments, this may eliminate a need for a separate pipeline stage for down-converting to the second output format.

In some embodiments, FMA unit 150 also generates an exponent adjustment value for the second instruction type in a same one of the multiple pipeline stages as for the first instruction type. In some embodiments, FMA unit 150 also generates an incremented mantissa (and in some situations an incremented exponent) for the second floating-point format in a same one of the multiple pipeline stages as for the first instruction type. This may be performed using a dummy bit, as shown in FIG. 6B.

Note that, in some embodiments, FMA 150 is configured to perform the methods of both FIGS. 7A and 7B when generating 16-bit FMA result 142.

Exemplary Device

Referring now to FIG. 8, a block diagram illustrating an exemplary embodiment of a device 800 is shown. In some embodiments, elements of device 800 may be included within a system on a chip. In some embodiments, device 800 may be included in a mobile device, which may be battery-powered. Therefore, power consumption by device 800 may be an important design consideration. In the illustrated embodiment, device 800 includes fabric 810, compute complex 820, input/output (I/O) bridge 850, cache/memory controller 845, graphics unit 880, and display unit 865.

Fabric 810 may include various interconnects, buses, MUX's, controllers, etc., and may be configured to facilitate communication between various elements of device 800. In some embodiments, portions of fabric 810 may be configured to implement various different communication protocols. In other embodiments, fabric 810 may implement a single communication protocol and elements coupled to fabric 810 may convert from the single communication protocol to other communication protocols internally.

In the illustrated embodiment, compute complex 820 includes bus interface unit (BIU) 825, cache 830, and cores 835 and 840. In various embodiments, compute complex 820 may include various numbers of processors, processor cores and/or caches. For example, compute complex 820 may include 1, 2, or 4 processor cores, or any other suitable number. In one embodiment, cache 830 is a set associative L2 cache. In some embodiments, cores 835 and/or 840 may include internal instruction and/or data caches. In some embodiments, a coherency unit (not shown) in fabric 810, cache 830, or elsewhere in device 800 may be configured to maintain coherency between various caches of device 800. BIU 825 may be configured to manage communication between compute complex 820 and other elements of device 800. Processor cores such as cores 835 and 840 may be configured to execute instructions of a particular instruction set architecture (ISA) which may include operating system instructions and user application instructions.

Cache/memory controller 845 may be configured to manage transfer of data between fabric 810 and one or more caches and/or memories. For example, cache/memory controller 845 may be coupled to an L3 cache, which may in turn be coupled to a system memory. In other embodiments, cache/memory controller 845 may be directly coupled to a memory. In some embodiments, cache/memory controller 845 may include one or more internal caches.

As used herein, the term "coupled to" may indicate one or more connections between elements, and a coupling may include intervening elements. For example, in FIG. 8, graphics unit 880 may be described as "coupled to" a memory through fabric 810 and cache/memory controller 845. In contrast, in the illustrated embodiment of FIG. 8, graphics unit 880 is "directly coupled" to fabric 810 because there are no intervening elements.

Graphics unit 880 may include one or more processors and/or one or more graphics processing units (GPU's). Graphics unit 880 may receive graphics-oriented instructions, such as OPENGL®, Metal, or DIRECT3D® instructions, for example. Graphics unit 880 may execute specialized GPU instructions or perform other operations based on the received graphics-oriented instructions. Graphics unit 880 may generally be configured to process large blocks of data in parallel and may build images in a frame buffer for output to a display. Graphics unit 880 may include transform, lighting, triangle, and/or rendering engines in one or more graphics processing pipelines. Graphics unit 880 may output pixel information for display images.

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and/or low-power always-on functionality, for example. I/O bridge 850 may also include interfaces such as pulse-width modulation (PWM), general-purpose input/output (GPIO), serial peripheral interface (SPI), and/or inter-integrated circuit (I2C), for example. Various types of peripherals and devices may be coupled to device 800 via I/O bridge 850.

Exemplary Graphics Processing

Referring to FIG. 9A, a flow diagram illustrating an exemplary processing flow 900 for processing graphics data is shown. In one embodiment, transform and lighting step 910 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 915 may involve discarding polygons or vertices that fall outside of a viewable area. Rasterize step 920 may involve defining fragments or pixels within each polygon and assigning initial color values for each fragment, e.g., based on texture coordinates of the vertices of the polygon. Shade step 930 may involve altering pixel components based on lighting, shadows, bump mapping, translucency, etc. Shaded pixels may be assembled in a frame buffer 935. Modern GPUs typically include programmable shaders that allow customization of shading and other processing steps by application developers. Thus, in various embodiments, the exemplary steps of FIG. 9A may be performed in various orders, performed in parallel, or omitted. Additional processing steps may also be implemented.

Referring now to FIG. 9B, a simplified block diagram illustrating one embodiment of a graphics unit 880 is shown. In the illustrated embodiment, graphics unit 880 includes programmable shader 960, vertex pipe 985, fragment pipe 975, texture processing unit (TPU) 965, image write buffer 970, memory interface 980, and texture state cache 990. In some embodiments, graphics unit 880 is configured to process both vertex and fragment data using programmable shader 960, which may be configured to process graphics data in parallel using multiple execution pipelines or instances.

Vertex pipe 985, in the illustrated embodiment, may include various fixed-function hardware configured to process vertex data. Vertex pipe 985 may be configured to communicate with programmable shader 960 in order to coordinate vertex processing. In the illustrated embodiment, vertex pipe 985 is configured to send processed data to fragment pipe 975 and/or programmable shader 960 for further processing.

Fragment pipe 975, in the illustrated embodiment, may include various fixed-function hardware configured to process pixel data. Fragment pipe 975 may be configured to communicate with programmable shader 960 in order to coordinate fragment processing. Fragment pipe 975 may be configured to perform rasterization on polygons from vertex pipe 985 and/or programmable shader 960 to generate fragment data. Vertex pipe 985 and/or fragment pipe 975 may be coupled to memory interface 980 (coupling not shown) in order to access graphics data.

Programmable shader 960, in the illustrated embodiment, is configured to receive vertex data from vertex pipe 985 and fragment data from fragment pipe 975 and/or TPU 965. Programmable shader 960 may be configured to perform vertex processing tasks on vertex data which may include various transformations and/or adjustments of vertex data. Programmable shader 960, in the illustrated embodiment, is also configured to perform fragment processing tasks on pixel data such as texturing and shading, for example. Programmable shader 960 may include multiple execution instances for processing data in parallel.

In some embodiments, the disclosed floating-point pipeline embodiments are included in a graphics unit, e.g., in programmable shader 960. The disclosed embodiments are not, however, restricted to graphics processors. Rather, the disclosed techniques may be implemented in floating-point units in central processing units (CPUs) FPGAs, etc.

TPU 965, in the illustrated embodiment, is configured to schedule fragment processing tasks from programmable shader 960. In some embodiments, TPU 965 is configured to pre-fetch texture data and assign initial colors to fragments for further processing by programmable shader 960 (e.g., via memory interface 980). TPU 965 may be configured to provide fragment components in normalized integer formats or floating-point formats, for example. In some embodiments, TPU 965 is configured to provide fragments in groups of four (a "fragment quad") in a 2×2 format to be processed by a group of four execution pipelines in programmable shader 960.

Image write buffer 970, in the illustrated embodiment, is configured to store processed tiles of an image and may perform final operations to a rendered image before it is transferred to a frame buffer (e.g., in a system memory via memory interface 980). Memory interface 980 may facilitate communications with one or more of various memory hierarchies in various embodiments.

In various embodiments, a programmable shader such as programmable shader 960 may be coupled in any of various appropriate configurations to other programmable and/or fixed-function elements in a graphics unit. The exemplary embodiment of FIG. 9B shows one possible configuration of a graphics unit 880 for illustrative purposes.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
pipelined multiplication circuitry that includes multiple pipeline stages and is configured to generate fused multiply-addition results based on first and second different instruction types, wherein:
the first instruction type specifies fused multiply-addition of input operands in a first floating-point format to generate a result in the first floating-point format; and
the second instruction type specifics fused multiply addition of input operands in the first floating-point format to generate a result in a second, lower-precision floating-point format; and
rounding circuitry configured to generate, for the second instruction type and prior to generating a fused multiply-addition result in the first floating-point format for particular input operands, rounding signals for the second floating-point format based on the particular input operands.

2. The apparatus of claim 1, wherein the second instruction types specifies generation of results in the second floating-point format that correspond to generation of a result of the fused multiply addition in the first floating-point format and down-converting the result to the second floating-point format.

3. The apparatus of claim 1, further comprising exponent circuitry configured to generate, for the second instruction type and prior to generating a fused multiply-addition result in the first floating-point format for particular input operands, exponent adjustment signals for the second floating-point format based on the particular input operands.

4. The apparatus of claim 3, wherein the exponent circuitry is configured to add an adjustment value to a sum of exponents of input multiplicands, based on an exponent of an input addend.

5. The apparatus of claim 1, further comprising increment circuitry configured to generate, for the second instruction type and prior to generating a fused multiply-addition result in the first floating-point format for particular input operands, an incremented mantissa for the second floating-point format based on the particular input operands.

6. The apparatus of claim 5, wherein the increment circuitry includes an adder configured to insert a dummy bit into an input mantissa, wherein the value of the bit is based on whether the first floating-point format or the second floating-point format is specified as an output format.

7. The apparatus of claim 1, wherein the first floating-point format is a 32-bit format and the second floating-point format is a 16-bit format.

8. The apparatus of claim 1, wherein the rounding circuitry includes:
first circuitry configured to generate a sticky signal by ORing bits of a portion of an initial result;
second circuitry configured to generate a first signal indicating whether a portion that includes multiple bits of the initial result are all logical ones; and
third circuitry configured to generate a round-up signal based on the sticky signal, the first signal, and one or more additional bits of the initial result.

9. An apparatus, comprising:
pipelined multiplication circuitry that includes multiple pipeline stages and is configured to generate fused multiply-addition results based on first and second different instruction types, wherein:
the first instruction type specifies fused multiply-addition of input operands in a first floating-point format to generate a result in the first floating-point format;
the second instruction type specifies fused multiply addition of input operands in the first floating-point format to generate a result in a second, lower-precision floating-point format; and
the pipelined multiplication circuitry is configured to generate a rounding action signal based on an initial multiplication-addition result for the second instruction type in a same one of the multiple pipeline stages as for the first instruction type.

10. The apparatus of claim 9, wherein the result of the second instruction type in the second, lower-precision format corresponds to a result of the fused multiply addition in the first floating-point format down-converted to the second floating-point format.

11. The apparatus of claim 9, wherein the pipelined multiplication circuitry is configured to generate an exponent adjustment value for the second instruction type in a same one of the multiple pipeline stages as for the first instruction type.

12. The apparatus of claim 9, wherein the pipelined multiplication circuitry includes increment circuitry configured to generate an incremented mantissa for the second floating-point format in a same one of the multiple pipeline stages as for the first instruction type.

13. The apparatus of claim 12, wherein the increment circuitry includes adder circuitry and is configured to generate the incremented mantissa using the adder circuitry for the second instruction type and the first instruction type.

14. The apparatus of claim 12, wherein the increment circuitry includes an adder configured to insert a bit into the mantissa, wherein the value of the bit is based on whether the first floating-point format or the second floating-point format is specified as an output format.

15. A method, comprising:
generating, by floating-point circuitry, fused multiply-addition results based on first and second different instruction types;
wherein the first instruction type specifies fused multiply-addition of input operands in a first floating-point format to generate a result in the first floating-point format,
wherein the second instruction type specifics fused multiply addition of input operands in the first floating-point format to generate a result in a second, lower-precision floating-point format; and
wherein the generating for the second instruction type includes generating, by rounding circuitry included in the floating-point circuitry, for the second instruction type and prior to generating a fused multiply-addition result in the first floating-point format for particular input operands, a rounding signal for the second floating-point format based on the particular input operands.

16. The method of claim 15, wherein the generating the rounding signal for the second instruction type is performed using a same pipeline stage of the floating-point circuitry as for generating rounding signals for the first instruction type.

17. The method of claim 15, wherein results of the second instruction type in the second, lower-precision format correspond to a result of a specified fused multiply addition in the first floating-point format down-converted to the second floating-point format.

18. The method of claim 15, further comprising:
generating, by exponent circuitry for the second instruction type and prior to generating a fused multiply-addition result in the first floating-point format for particular input operands, exponent adjustment signals for the second floating-point format based on the particular input operands.

19. The method of claim 18, wherein the generating the exponent adjustment signals is performed using a same pipeline stage of the floating-point circuitry as generating exponent adjustment signals for the first instruction type.

20. The method of claim 15, further comprising generating, by increment circuitry, an incremented value that is valid for both the first instruction type and the second instruction type, including inserting a bit into a mantissa input to an adder that is based on whether the first floating-point format or the second floating-point format is specified as an output format.

* * * * *